No. 654,753. Patented July 31, 1900.
J. NEY.
HAY SLING PULLEY.
(Application filed Dec. 4, 1899.)
(No Model.)
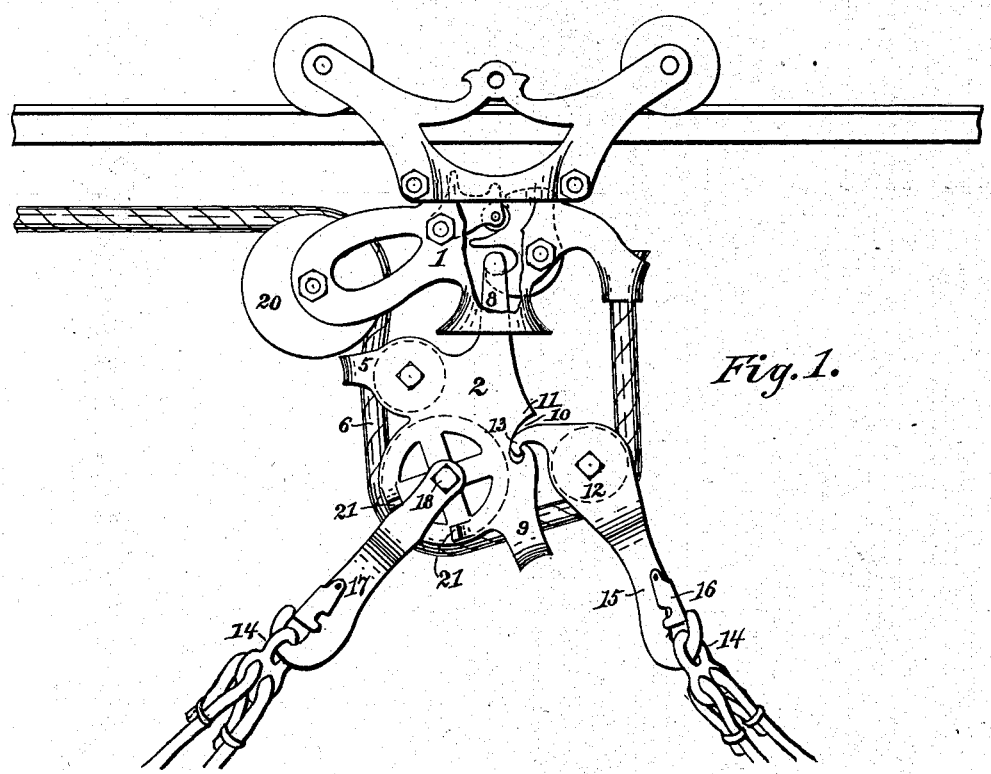
Fig. 1.
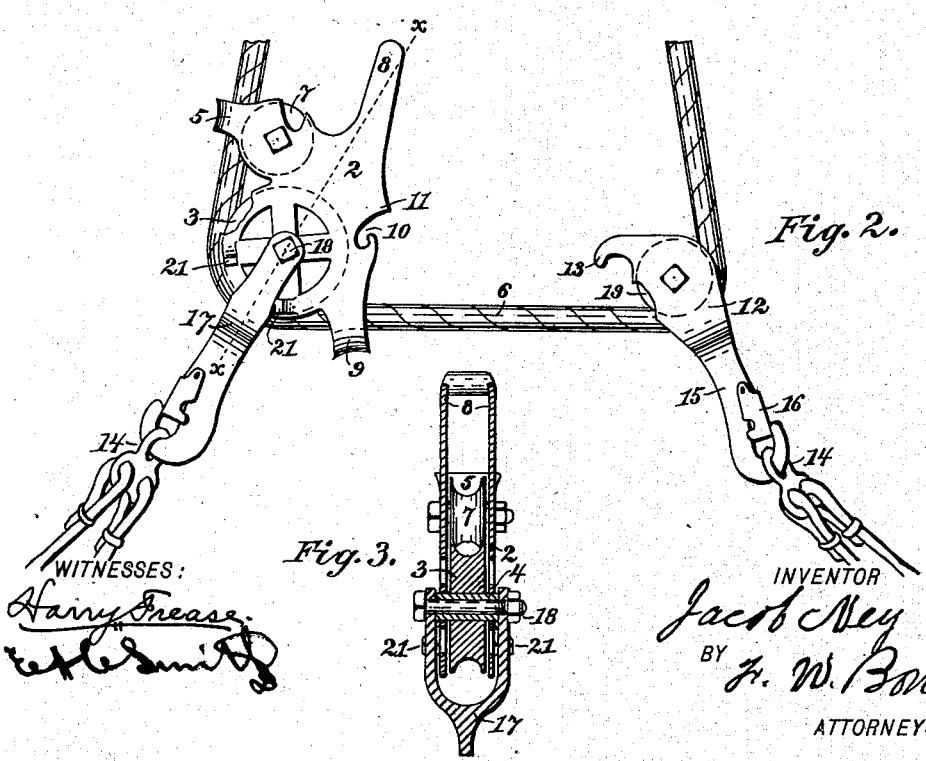
Fig. 2.
Fig. 3.
WITNESSES:
Harry Frease
INVENTOR
Jacob Ney
BY F. W. Boid
ATTORNEY.

UNITED STATES PATENT OFFICE.

JACOB NEY, OF CANTON, OHIO, ASSIGNOR TO THE V. L. NEY COMPANY, OF SAME PLACE.

HAY-SLING PULLEY.

SPECIFICATION forming part of Letters Patent No. 654,753, dated July 31, 1900.

Application filed December 4, 1899. Serial No. 739,191. (No model.)

*To all whom it may concern:*

Be it known that I, JACOB NEY, a citizen of the United States, residing at Canton, in the county of Stark and State of Ohio, have invented certain new and useful Improvements in Hay-Sling Pulleys; and I do hereby declare that the following is a full, clear, and exact description of the same, reference being had to the annexed drawings, making a part of this specification, and to the figures of reference marked thereon, in which—

Figure 1 is a side elevation showing the members of the pulley-block pulley connected to a hay-elevator. Fig. 2 is a view showing the members of the pulley-block separated and the elevating-rope properly connected. Fig. 3 is a transverse section through line $xx$, Fig. 2.

The present invention has relation to hay-sling pulleys; and it consists in the novel arrangement hereinafter described, and particularly pointed out in the claims.

Similar numerals of reference indicate corresponding parts in all the figures of the drawings.

In the accompanying drawings, 1 represents the hay carrier or frame, which is to travel back and forth upon a track or way in the usual manner and may be of the usual construction.

The pulley head or frame 2 is provided with the pulley 3, which pulley is journaled upon the hollow shaft 4, said hollow shaft being in turn journaled to the pulley head or frame 2. The pulley head or frame 2 is provided with the lateral extension 5, which lateral extension is extended to a distance to allow the elevating-rope 6 to pass through said extension substantially as illustrated in Figs. 1 and 2. The extension 5 is also provided with the antifriction-roller 7, said antifriction-roller being journaled to the frame or head in any convenient and well-known manner. The upper portion of the frame or head 2 is provided with registering head 8, which is formed of a shape or size so as to be connected to the carriage 1 in the ordinary manner, it being understood that different locking devices will be employed and different-shaped registering heads used. For the purpose of providing a guide for the elevating-rope 6 the extension 9 is provided and is located at the bottom or lower portion of the pulley-block 2. Upon one side of the pulley-block 2 is located the recess 10, which recess is substantially of the form shown and is located under the ledge or flange 11.

The pulley-block 12 is preferably formed as shown, and as shown its top or upper end is provided with the hook 13, which hook is for the purpose of engaging the notch or recess 10, and thereby connect the pulley-blocks 2 and 12 together, as hereinafter described.

The device herein shown and described is designed to be used in connection with a hay-sling, which sling may be of any desired construction, and the sling is to be provided with the ordinary connecting loops or links 14, to which loops or links the ends of the sling are to be connected, as illustrated in the drawings.

The pulley block or head 12 is provided with the arm 15, the bottom or lower end of which is provided with a snap-hook 16. The pulley-block 2 is provided with the pivoted snap-hook arm 17, which snap-hook arm is connected to the cross-bolt 18, said cross-bolt being located in the hollow shaft 4, as illustrated in Fig. 3, and is so located for the purpose of giving the pivoted arm 17 a common center with the pulley 3.

One end of the elevating-rope 6 is connected to the carrier 1 in any convenient and well-known manner and is extended downward and around the pulley 19, thence through the guide 9 and around the pulley 3 and upward through the guide 5 and over the pulley 20, and extended to the place where power is to be applied, the elevating-rope being connected and operated in substantially the same manner that elevating-ropes are connected and operated when used in connection with a hay-elevator.

In use the ends of the sling are connected to the pivoted arm 17 and the arm 15 by means of the loops or links 14 and the snap-hooks located upon the lower ends of the arms 17 and 15. It will be understood that the pulley-block arm 15, together with its pulley 19, is to be detached from the block or head 2 and said blocks or heads placed at the ends of the sling, the elevating-rope being connected as illustrated in Fig. 2. When power is applied, the ends of the sling will be elevated and at the same time brought toward each other until the two elevating-heads are brought in contact with each other, at which time the hooks 13 will engage the recess 10, thereby connecting the two heads together, after which the load contained in the sling is elevated.

For the purpose of holding the pulley-block 2 in a vertical position, or substantially such, the guide 5 is provided, to one side of which is located the antifriction wheel or roller 7.

The roller 20 is connected to the frame or carriage 1 at such point that when the block or head 2, together with its registering head 8, and the detachable head 12 are brought into close proximity with the lower end of the carriage or frame said registering head will be below the locking device of the carriage.

In use different-sized loads are elevated, and hence the sling will assume a position corresponding with the bulk of the load, thereby causing a variance to a certain extent of the position of the registering head. In order to overcome this variance, the arm 17 is pivotally connected to the head 2, thereby allowing the registering head 8 to assume a true vertical position regardless of the bulk of load being elevated. The above result is brought about by allowing the arm 17 to move upon its pivotal point, or, in other words, producing a hinge connection between the registering head and the load. For the purpose of limiting the movement of the pivoting-arm 17 stops 21 are provided, said stops being located upon the sides or side of the pulley-block 2. By providing the guide 5 and locating said guide above the pulley 3 and locating the antifriction-roller 7 as shown the registering head 8 will be guided to the locking device of the carriage.

Having fully described my invention, what I claim as new, and desire to secure by Letters Patent, is—

1. The combination of a pulley-block provided with a registering head and a pulley, a recess being in one side of the pulley-block, an arm pivoted concentric with the axle of the pulley in the pulley-block, and a detachable head provided with a pulley and a hook, the hook adapted to engage the recess in the block provided with a registering head, substantially as and for the purpose specified.

2. The combination of a pulley-block provided with a registering head and a pulley, a notch or recess located upon one of its sides, an antifriction-roller, and an arm pivoted concentrically with the axle in the pulley-block, and a head provided with a hook adapted to engage the recess in the pulley-block, substantially as and for the purpose specified.

3. The combination of a pulley-head formed of separable blocks, and each of the blocks provided with pulleys, and one of said blocks provided with a registering head, an arm pivoted concentrically with the axle in the pulley-block provided with the registering head, a recess formed in the side of the block provided with the pivoted arm, and the other block provided with a hook to engage the recess, and stops to limit the movement of the pivoted arm, substantially as and for the purpose specified.

In testimony that I claim the above I have hereunto subscribed my name in the presence of two witnesses.

JACOB NEY.

Witnesses:
J. A. JEFFERS,
E. H. SMITH.